May 14, 1963  D. R. LAUX  3,089,707
FEED CHUCKS
Filed July 3, 1961

INVENTOR.
David R. Laux
BY
Parker & Brochman
ATTORNEYS.

() # United States Patent Office 3,089,707
Patented May 14, 1963

3,089,707
FEED CHUCKS
Daniel R. Laux, Elmira, N.Y., assignor to
Hardinge Brothers, Inc., Elmira, N.Y.
Filed July 3, 1961, Ser. No. 121,560
4 Claims. (Cl. 279—23)

This invention relates to improvements in feed chucks or feed fingers of the type commonly used for advancing the work or stock in automatic screw machines, lathes or the like. Feed chucks of this general type are shown in Peterson Patent No. 2,845,274.

In the feeding of work or stock in a machine, the advancing of the work is sometimes interfered with when the work is in the form of long bars or rods which may vibrate or "whip" considerably while being rotated. It has been found that by gripping the work at two portions thereof spaced from each other, the feeding of the work is more reliable.

It is consequently one of the objects of this invention to provide a feed chuck with two sets of springs which grip the work for feeding the same, one set being arranged in advance of the other.

It is also an object of this invention to provide a feed chuck in which the two sets of springs may be adjusted relatively to each other to vary the pressure exerted by the springs on the work.

Another object is to construct the tubular body member of the feed chuck in two parts to enable the second set of springs to be positioned in or removed from the feed chuck and be adjusted.

Figure 1:
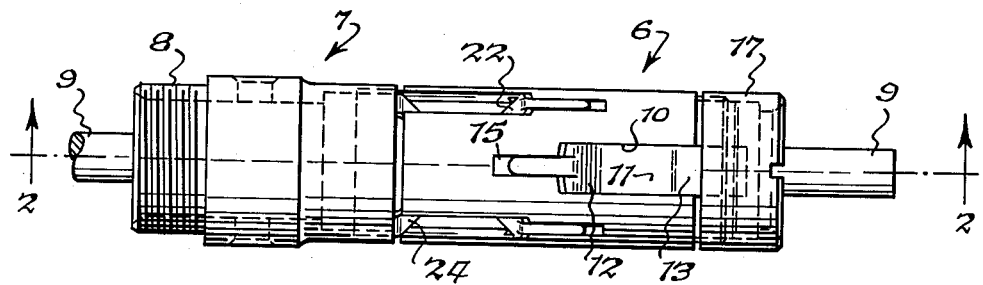
FIG. 1 is a side view of a feed chuck embodying my invention.
Figure 2:
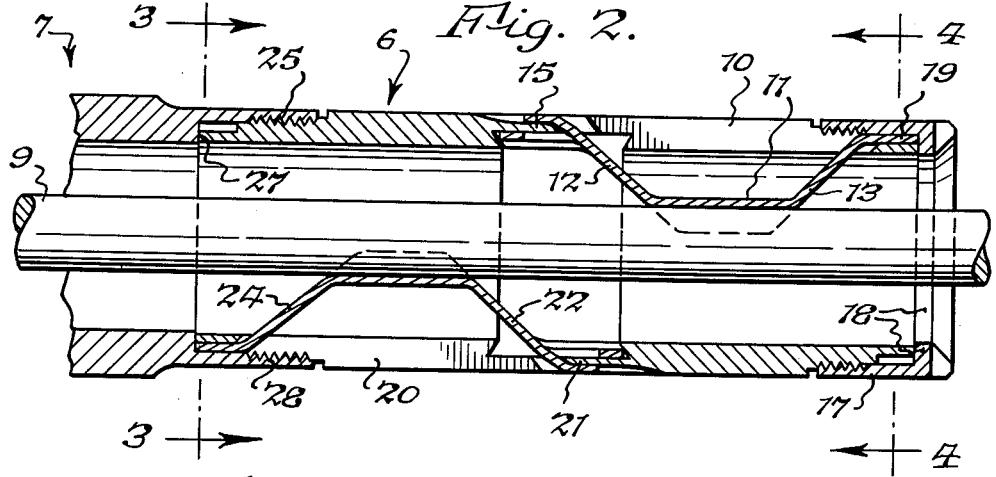
FIG. 2 is a central, sectional elevation of a portion thereof on an enlarged scale.
Figure 3:
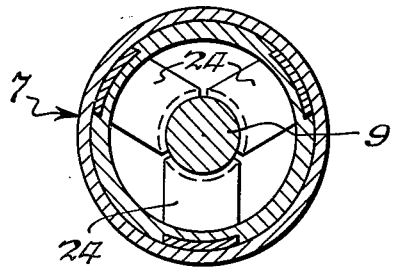
Figure 4:
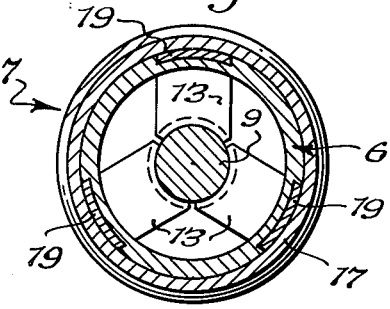

FIGS. 3 and 4 are transverse sections thereof on lines 3—3 and 4—4, FIG. 2.

My improved feed chuck includes a tubular body portion which as hereafter more fully described is made in two parts 6 and 7. The rear part 7 of the feed chuck is provided at the back or work-receiving end thereof with an externally threaded part 8 formed for threaded engagement with the usual feed tube (not shown), of a screw machine or lathe, this feed tube being advanced in the direction of its axis whenever the work or stock is to be fed forwardly. 9 represents a workpiece or stock with which the feed chuck may cooperate.

My improved feed chuck is provided in the front body portion 6 thereof with a set of springs mounted thereon in a manner similar to that shown in the Peterson Patent No. 2,845,274 of July 29, 1958. The springs employed in connection with my improved feed chuck are arranged in cutout portions or slots 10 intermediate of the ends of the body portion adjacent to the discharge end thereof, the slots being equally spaced about the periphery of the body portion. Any desired number of these slots may be provided, depending mainly on the cross section of the stock, three being shown in the construction illustrated by way of example. These springs are bowed inwardly so that their middle portions 11 extend toward the axis of the body portion into position to engage the stock. The springs have diverging portions 12 and 13 integral with the middle portions 11 and extending outwardly therefrom. The end of the diverging portion 12 has the middle portion thereof punched out to form three fingers, the middle one being bent outwardly from the other two fingers of the spring end, and the body member is provided at the rear end of each slot with a projection or tongue 15 which is straddled by the fingers of the extension 12 of the spring. At the forward end of the slots 10 the body member is threaded to cooperate with a correspondingly threaded sleeve 17 having an inwardly extending flange or shoulder 18 adapted to abut against the end of the forwardly extending diverging portion 13 of each spring. The threaded part of the body member which cooperates with the sleeve 17 has shallow recesses or grooves formed therein into which the ends 19 of the forwardly extending diverging portion 13 of the springs may enter. The sleeve 17 consequently holds the ends 19 of the springs in the recessed portions of the body member and also abut the forward ends of the springs which extend outwardly beyond the outer ends of the recesses in the body member, to hold them under the desired tension by exerting endwise pressure thereon. Consequently the sleeve may be adjusted to exert the desired pressure against the forward end of the part 19 of each spring which in turn determines the pressure exerted against the rod or workpiece. It will also be obvious that upon removing the sleeve 17, the springs can be readily removed from or inserted into the body member.

The second set of springs is constructed similar to the first set and arranged rearwardly from the first set, and these springs are accommodated in the body portion 6 by means of additional slots 20 formed in this portion of the body member, the slots being reversed from those of the forward slots 10 and terminating at their forward ends in tongues 21 which may be straddled by the bifurcated ends of the springs, which, in this case, are on the forwardly diverging portions 22 of the springs, the springs being reversed end for end from those of the first set. The slots 20 are preferably formed in staggered relation to the slots 10 for the other set of springs, so as to avoid weakening of the body member and so that the workpieces may be grasped at different circumferential parts of their peripheries.

In order to position the second set of springs in the front portion 6 of the body member, I have divided this body member crosswise thereof into two parts 6 and 7 which are connected with each other by means of cooperating screw threads 25 and by forming a part of the portion 7 of the body member into a shape similar to the sleeve 17. The rear end of the body portion 6 is provided with shallow recesses in which the axially extending ends of the outwardly diverging portions 24 are seated in the same manner as the forward ends of the springs of the first set. The rear ends of the springs of the second set may extend somewhat beyond the shallow recesses formed in the body portion 6 in position to be engaged by the shoulder 27 of the rear body portion 7. Consequently by adjusting the rear body portion relatively to the forward body portion by means of the screw threads 28, the tension of the springs of the rear set may also be adjusted. In the drawings the rear body portion 7 and the sleeve 17 are shown as compressing the springs to the maximum extent, but by adjusting these parts so that the shoulders 18 and 27 are spaced farther from the ends of the shallow recesses in the body portion 6 the ends of the springs in the shallow recesses may extend out beyond the same so that the pressure on the springs is reduced. By bearing against the flange 18 and the shoulder 27, these springs yieldingly hold these parts against turning and changing adjustments of the springs.

The rear body portion 7 may be removed from the front body portion by unscrewing these two parts of the body and thus provide access to the rear end of the body portion to make possible the insertion or removal of the springs of the rear set. The front and rear body portions are threaded together with the same hand of thread as the front sleeve or cap 17. This allows independent adjustment of the rear spring and will keep them from unscrewing in the same manner as the front sleeve.

While I have shown my improved feed chuck applied to the feeding of stock of circular cross section, yet it will be obvious that the chuck can be readily used for feeding hexagonal stock by merely changing the springs so that their work-engaging parts engage hexagonal stock. By different locations of the slots 10 and 20, feed chucks embodying my invention can be readily adapted for use in feeding stock of square cross section.

The feed chuck described has the advantage that it supports the stock at different distances from the end thereof so that the tendency of the stock to vibrate or "whip" will be materially reduced. Furthermore, the two sets of springs will obviously grip the stock more securely than a single set and consequently a more positive feeding of the stock will result. By the use of two sets of springs in place of a single set, the springs may also be designed so that each set of springs will grip the stock with less force and the life of the springs will be greatly extended. Furthermore the rear set of springs will facilitate, in the case of non-circular stock, the correct positioning of the stock about its axis for proper feeding to the front set of springs.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. A feed chuck including a tubular body member having two sets of springs, said sets being spaced one in advance of the other in said body member, each of said springs having an intermediate portion extending inwardly from said body portion in position to yieldingly engage the stock to be operated upon, the springs of each set being arranged circumferentially at substantially equal intervals from each other and the springs of the two sets being arranged in staggered relation to each other.

2. A feed chuck including a tubular body member formed of front and rear parts, said front part having two sets of springs mounted thereon, one in advance of the other, a sleeve having a threaded engagement with said front part of said body portion and engaging the springs of the advance set for varying the force exerted thereby on the work, said rear part of said body member having a threaded engagement with said front part and engaging the springs of the other set for adjusting the force exerted thereby on the work.

3. A feed chuck including a tubular body member comprising front and rear parts, the front part having front and rear sets of longitudinally extending slots arranged one in advance of the other, the slots of each set being arranged intermediate of the ends of the body member at intervals about the periphery thereof, said sets being arranged with the slots in staggered relation to each other, work-engaging springs having their ends connected with the body member at the ends of said slots, one end of each spring being removably held in fixed relation to one end of its slot and the other end of each spring being adjustable to vary the tension of the spring on the work, the rear portion of the body member being provided with a shoulder formed to engage said last mentioned end of each spring of the rear set for adjusting the pressure which said ends of the springs of said rear set exert against the work.

4. A feed chuck according to claim 3 in which said front and rear parts of said feed chuck are connected by screw threads by means of which said rear part is adjustable relatively to said front part and relatively to said springs of the rear set to vary the force exerted by said springs of the rear set on the work.

References Cited in the file of this patent

UNITED STATES PATENTS

| | | |
|---|---|---|
| 933,377 | Hyde | May 30, 1911 |
| 2,466,129 | Stoner | Apr. 5, 1949 |
| 2,845,274 | Peterson | July 29, 1958 |
| 2,935,329 | Hessler | May 3, 1960 |